United States Patent
Schmookler

(10) Patent No.: US 11,761,546 B1
(45) Date of Patent: Sep. 19, 2023

(54) VALVE ASSEMBLY

(71) Applicant: Peter Schmookler, Austin, TX (US)

(72) Inventor: Peter Schmookler, Austin, TX (US)

( * ) Notice: Subject to any disclaimer, the term of this patent is extended or adjusted under 35 U.S.C. 154(b) by 0 days.

(21) Appl. No.: 17/824,018

(22) Filed: May 25, 2022

(51) Int. Cl.
*F16K 5/06* (2006.01)
*F16K 31/46* (2006.01)
*F16K 31/60* (2006.01)
*E03C 1/02* (2006.01)

(52) U.S. Cl.
CPC .......... *F16K 5/0652* (2013.01); *F16K 31/465* (2013.01); *F16K 31/602* (2013.01); *E03C 2001/026* (2013.01)

(58) Field of Classification Search
CPC .... F16K 31/465; F16K 31/602; F16K 5/0652; E03C 1/025; E03C 1/0408
USPC .......................................................... 251/244
See application file for complete search history.

(56) References Cited

U.S. PATENT DOCUMENTS

| | | |
|---|---|---|
| 2,965,313 A | 12/1960 | Jay |
| 3,422,851 A * | 1/1969 | Ray ...................... F16K 5/0605 137/596.17 |
| 6,959,914 B1 * | 11/2005 | Corral ..................... E03C 1/021 251/293 |
| 7,694,359 B1 | 4/2010 | Hall |
| 9,677,253 B1 | 6/2017 | Corneliussen |
| 2009/0194612 A1 | 8/2009 | Mang |
| 2009/0223579 A1 | 9/2009 | Bautch |
| 2010/0264345 A1 | 10/2010 | Tips |
| 2018/0020878 A1 | 1/2018 | Colburn |

FOREIGN PATENT DOCUMENTS

WO WO2010120401 10/2010

* cited by examiner

*Primary Examiner* — Kenneth Rinehart
*Assistant Examiner* — Nicole Gardner

(57) ABSTRACT

A valve assembly for controlling flow of water to a shower head includes a tube, which is insertable between and attachable to an inlet pipe for a shower enclosure and a shower head. A valve positioned in the tube regulates a flow of water through the tube. A shaft is attached the valve and extends through a sidewall of the tube and a housing. A biaser positioned in the housing is operationally engaged to the shaft and biases the valve to an open configuration. A lever arm is attached to and extends from the shaft. A handle is attached to the lever arm distal from the shaft. The handle can be moved by a user from a first position to a second position, thus actuating the biaser to rotate the valve from a closed configuration to the open configuration so that water flows through the tube to the shower head.

9 Claims, 12 Drawing Sheets

VALVE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to valve assemblies and more particularly pertains to a new valve assembly for controlling flow of water to a shower head. The present invention discloses a valve assembly installable between and inlet pipe and a shower head to regulate a flow of water from the inlet pipe to the shower head.

(2) Description of Related Art Including Information Disclosed Under 37 CFR 1.97 and 1.98

The prior art relates to valve assemblies. Prior art valve assemblies may comprise ball valves with handles or with levers to which handles are attached. What is lacking in the prior art is a valve assembly comprising a tube, which is insertable between and attachable to an inlet pipe for a shower enclosure and a shower head. A valve, which is positioned in the tube, regulates a flow of water through the tube and is biased to an open configuration by a biaser positioned in the housing. A handle is attached to a lever arm, which is attached to a shaft that is attached to the valve. The handle can be moved by a user from a first position to a second position, thus actuating the biaser to rotate the valve from a closed configuration to the open configuration so that water flows through the tube to the shower head.

BRIEF SUMMARY OF THE INVENTION

An embodiment of the disclosure meets the needs presented above by generally comprising a tube, which configured to be inserted between and attached to an inlet pipe for a shower enclosure and a shower head so that the shower head is in fluidic communication with the inlet pipe. A valve is positioned in and is rotationally attached to the tube and is configured to regulate a flow of water through the tube. A housing is attached to the tube. A shaft is attached by a first terminus to the valve and extends through a sidewall of the tube and the housing so that a second terminus of the shaft is external to the housing. A biaser is positioned in and is attached to the housing. The biaser is operationally engaged to the shaft so that the biaser biases the valve to an open configuration. A lever arm is attached to and extends from the second terminus of the shaft. A handle is attached to the lever arm distal from the shaft. The handle is configured to be grasped in a hand of a user, positioning the user to move the handle from a first position to a second position, thus actuating the biaser to rotate the valve from a closed configuration to the open configuration so that water flows through the tube to the shower head.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
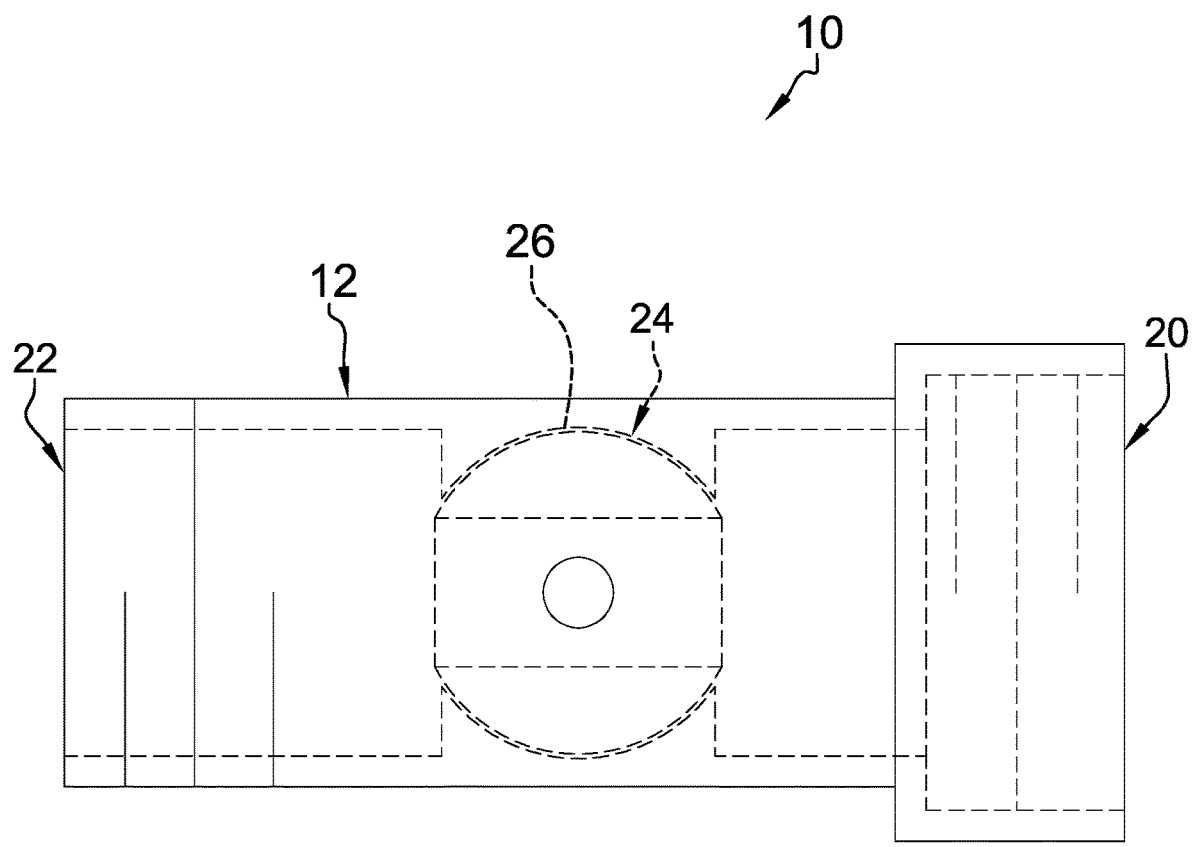
FIG. 1 is a first side view of a valve assembly according to an embodiment of the disclosure.

With reference now to the drawings, and in particular to FIGS. 1 through 12 thereof, a new valve assembly embodying the principles and concepts of an embodiment of the disclosure and generally designated by the reference numeral 10 will be described.

As best illustrated in FIGS. 1 through 12, the valve assembly 10 generally comprises a tube 12, which configured to be inserted between and attached to an inlet pipe 14 for a shower enclosure 16 and a shower head 18. The shower head 18 is in fluidic communication with the inlet pipe 14. The tube 12 has a first end 20, which is internally threaded, and a second end 22, which is externally threaded. The first end 20 and the second end 22 are complementary to external threads on the inlet pipe 14 and internal threads of the shower head 18, respectively. The tube 12 thus can be threadedly attached to both the inlet pipe 14 and the shower head 18.

Figure 3:
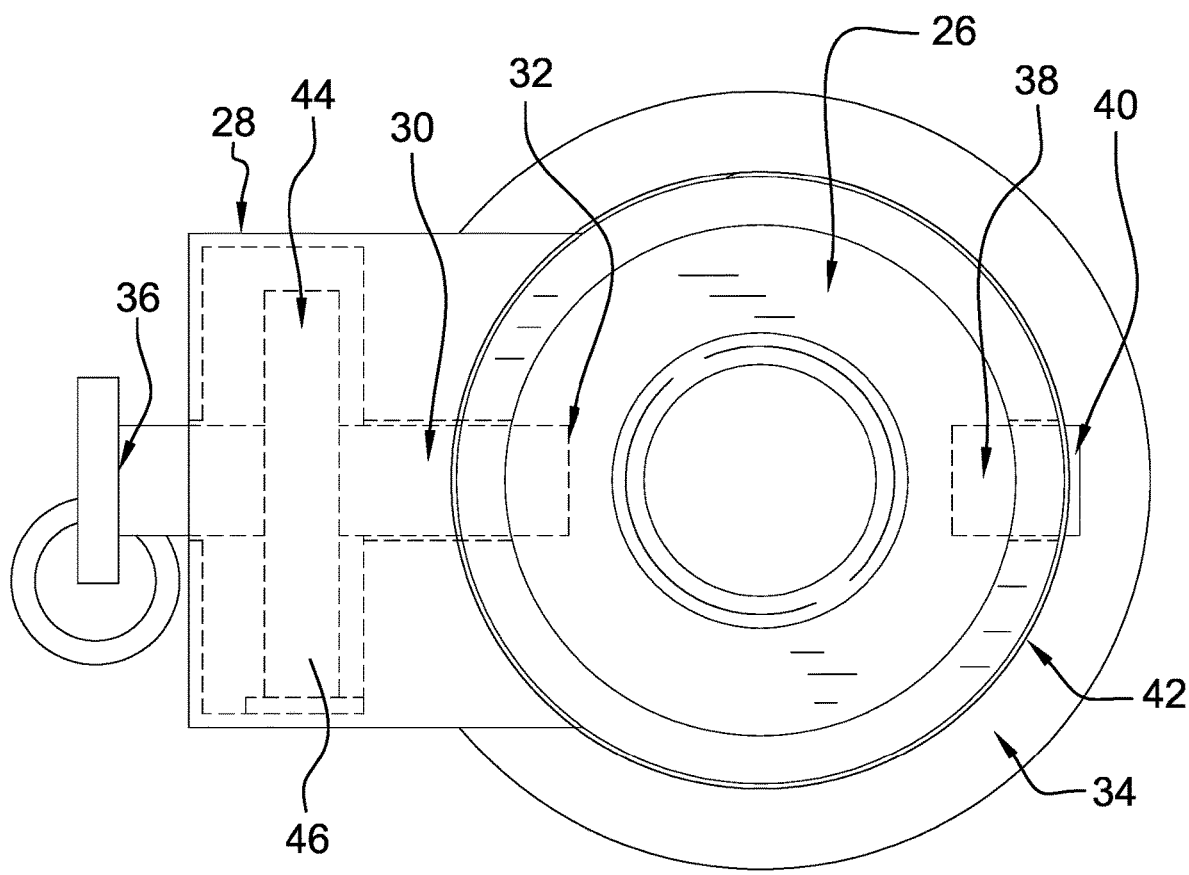
FIG. 3 is a front view of an embodiment of the disclosure.
Figure 4:
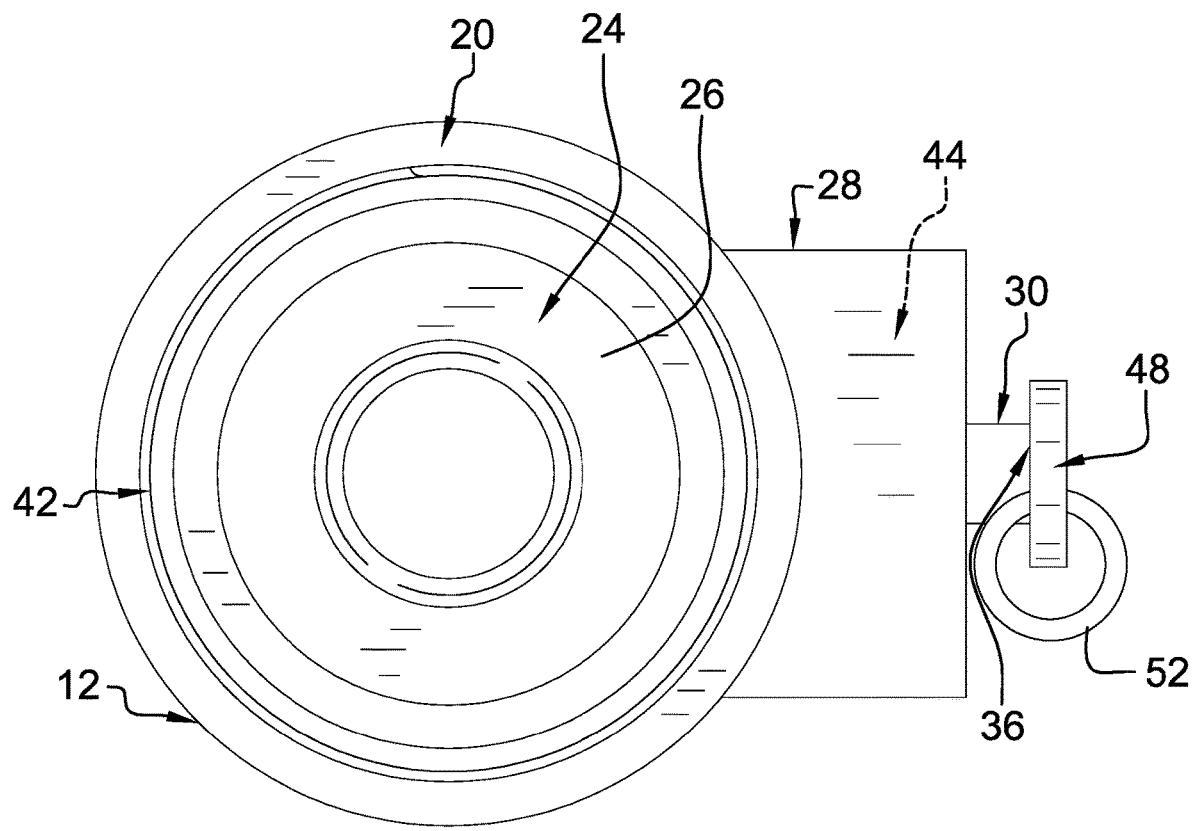
FIG. 4 is a rear view of an embodiment of the disclosure.
Figure 5:
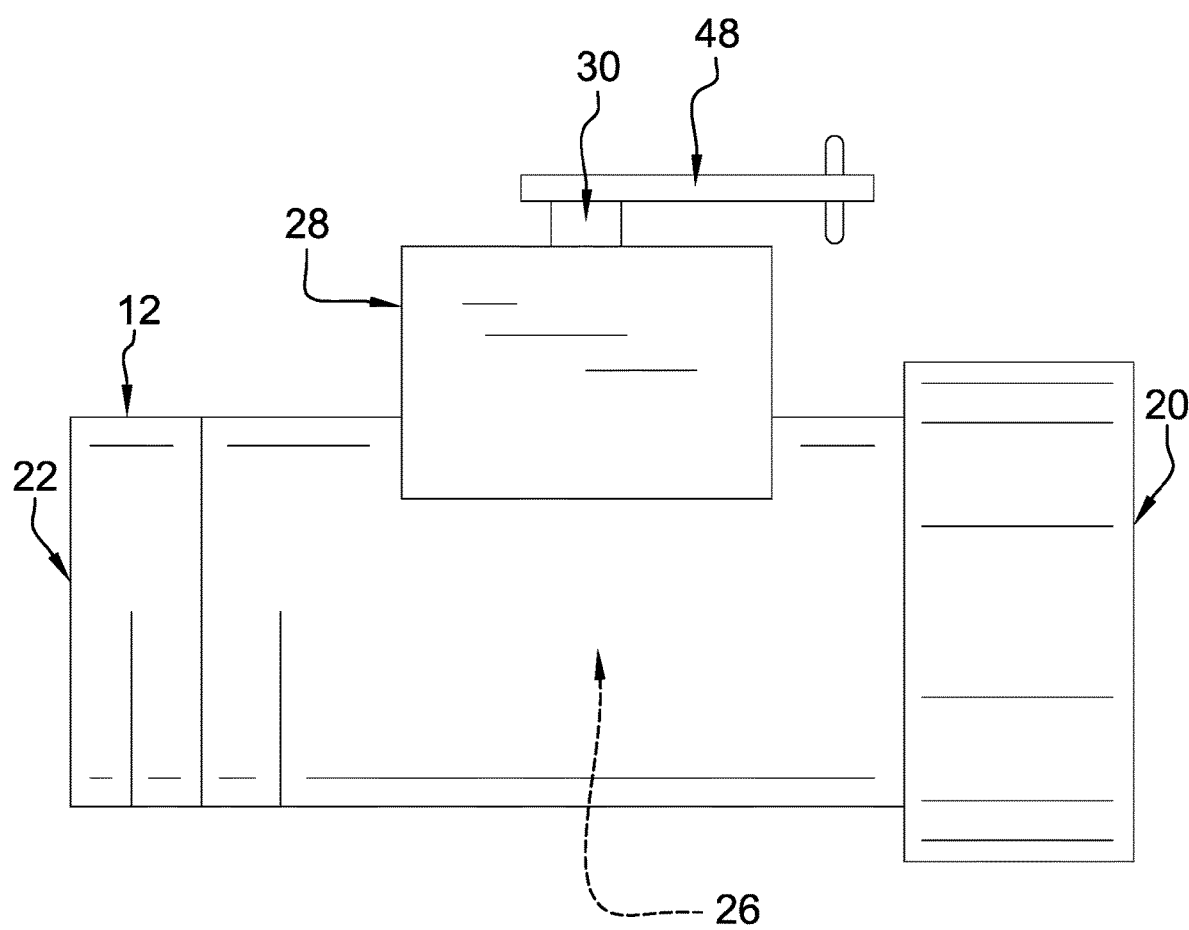
FIG. 5 is a top view of an embodiment of the disclosure.

A valve 24 is positioned in and is rotationally attached to the tube 12 and is configured to regulate a flow of water through the tube 12. The valve 24 may comprise a ball valve 26, as shown in FIGS. 3 and 4, a butterfly valve, or the like.

A housing 28 is attached to the tube 12. A shaft 30 is attached by a first terminus 32 to the valve 24 and extends through a sidewall 34 of the tube 12 and the housing 28 so that a second terminus 36 of the shaft 30 is external to the housing 28. A rod 38 is attached to and extends from the valve 24 into a recess 40, which extends into an inner surface 42 of the tube 12. The rod 38 is opposingly positioned on the valve 24 relative to the shaft 30 and is rotatable within the recess 40. The rod 38 thus is positioned to stabilize the valve 24 within the tube 12.

Figure 2:
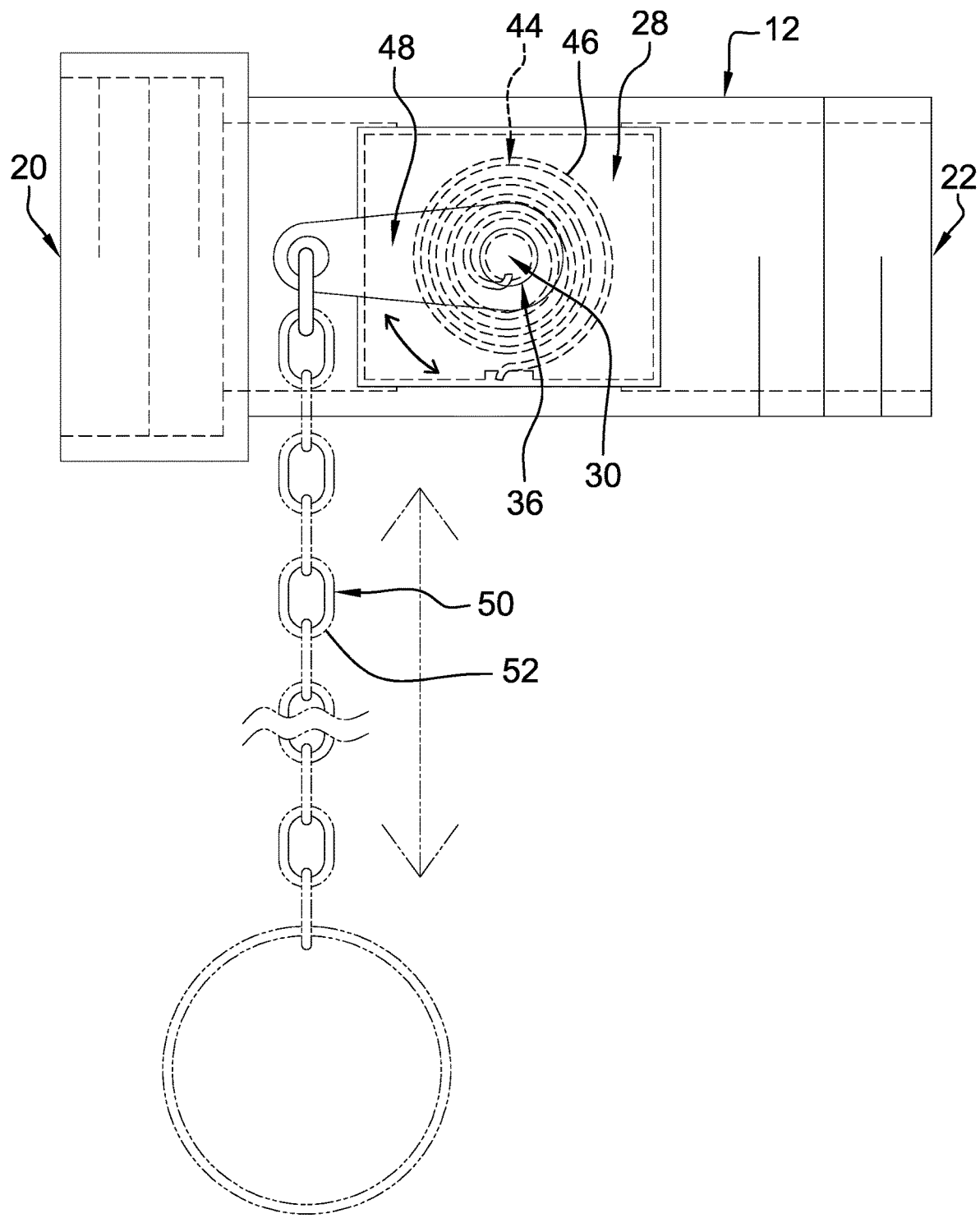
FIG. 2 is a second view of an embodiment of the disclosure.

A biaser 44 is positioned in and is attached to the housing 28. The biaser 44 is operationally engaged to the shaft 30 so that the biaser 44 biases the valve 24 to an open configuration. As shown in FIG. 2, the biaser 44 comprises a torsion spring 46. A lever arm 48 is attached to and extends from the second terminus 36 of the shaft 30. A handle 50 is attached to the lever arm 48 distal from the shaft 30. The handle 50 is configured to be grasped in a hand of a user, positioning the user to move the handle 50 from a first position to a second position, thus actuating the biaser 44 to rotate the valve 24 from a closed configuration to the open configuration so that water flows through the tube 12 to the shower head 18.

Figure 6:
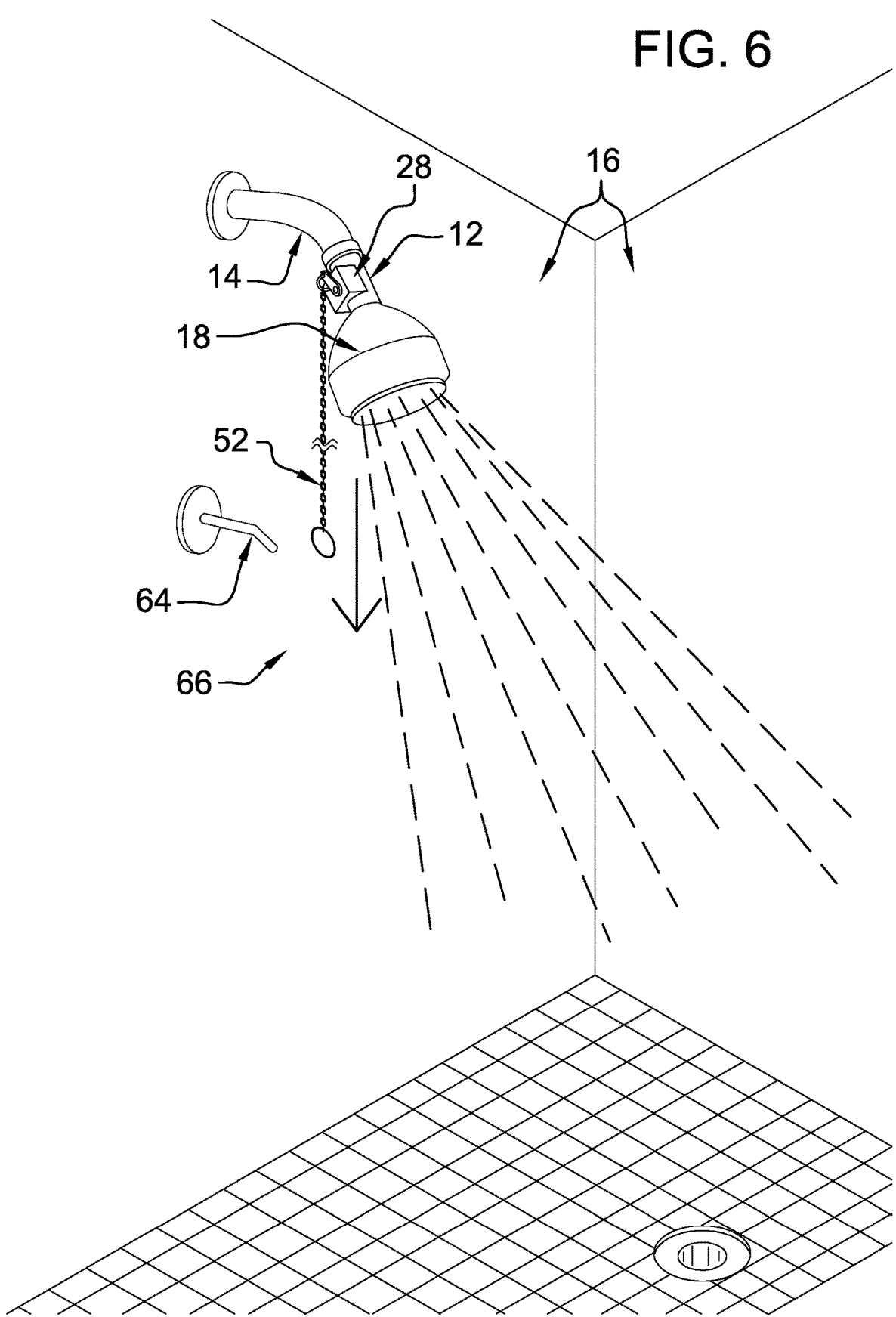
FIG. 6 is an in-use view of an embodiment of the disclosure.
Figure 9:
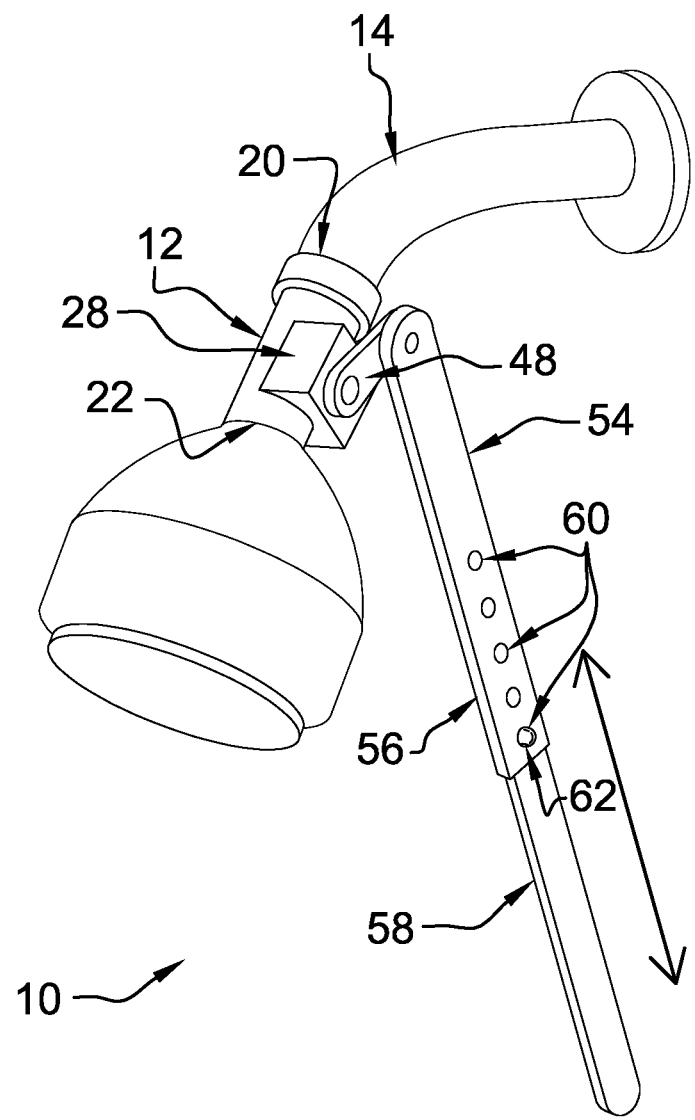
FIG. 9 is an isometric perspective view of an embodiment of the disclosure.

The handle 50 may comprise a chain 52, as shown in FIG. 6, a bar 54, as shown in FIG. 9, or the like. The bar 54 comprises an upper segment 56, which is rotationally engaged to the lever arm 48, and a lower segment 58, which is selectively extensible from the upper segment 56. A plurality of holes 60 is positioned in the upper segment 56. A pin 62, which is spring loaded, is engaged to the lower segment 58 and is depressible to allow extension and retraction the lower segment 58. The pin 62 is positioned to extend into a respective hole 60 to fixedly position the lower segment 58 relative to the upper segment 56.

Figure 7:
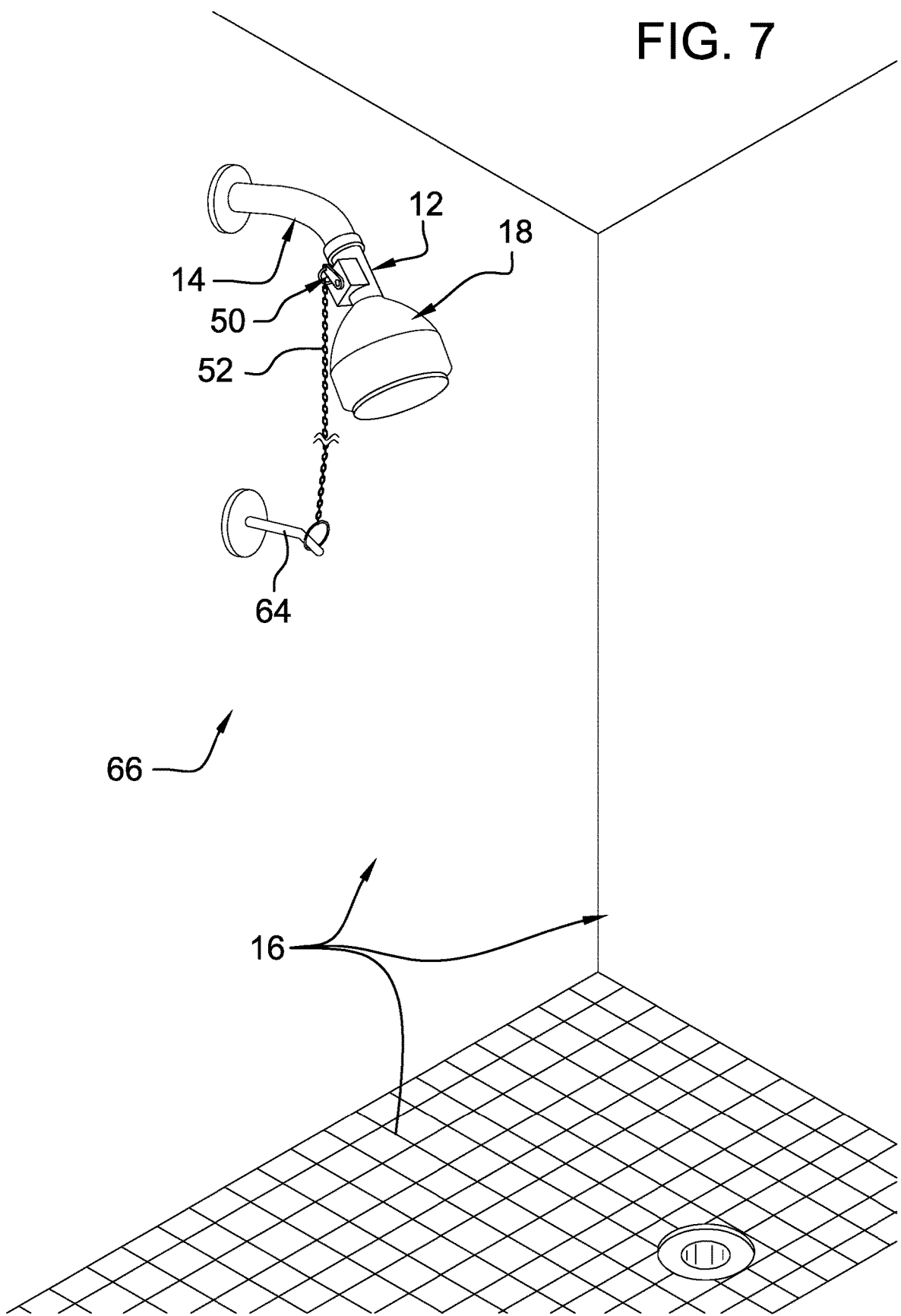
FIG. 7 is an in-use view of an embodiment of the disclosure.
Figure 8:
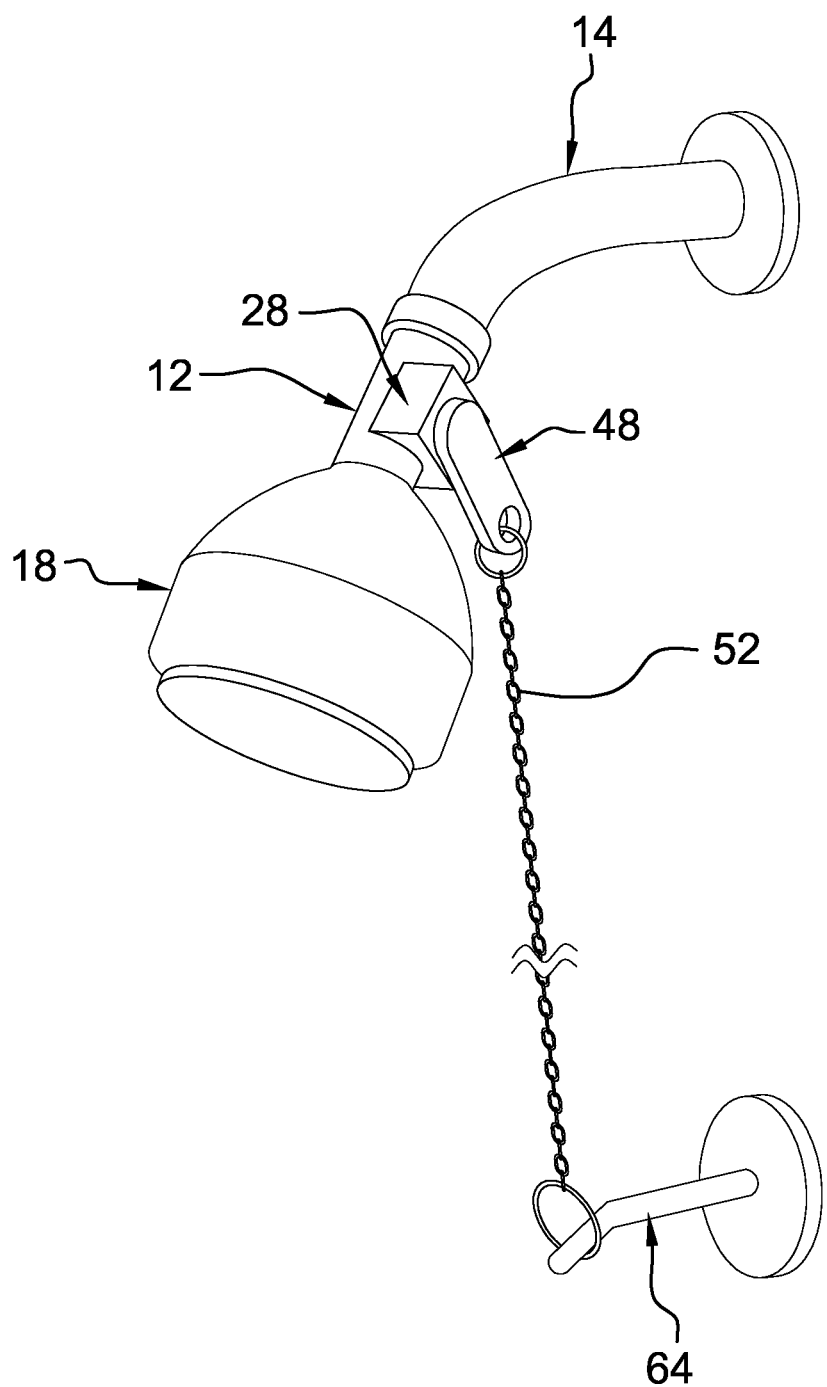
FIG. 8 is an isometric perspective view of an embodiment of the disclosure.

In one configuration, as shown in FIG. 6, the valve assembly 10 comprises a hook 64, which is configured to be mountable to a wall 66 of the shower enclosure 16 below the inlet pipe 14. The hook 64 is positioned to selectively hook the chain 52 to fixedly position the handle 50 in the first position with the valve 24 in the closed configuration, as shown in FIG. 7.

Figure 10:
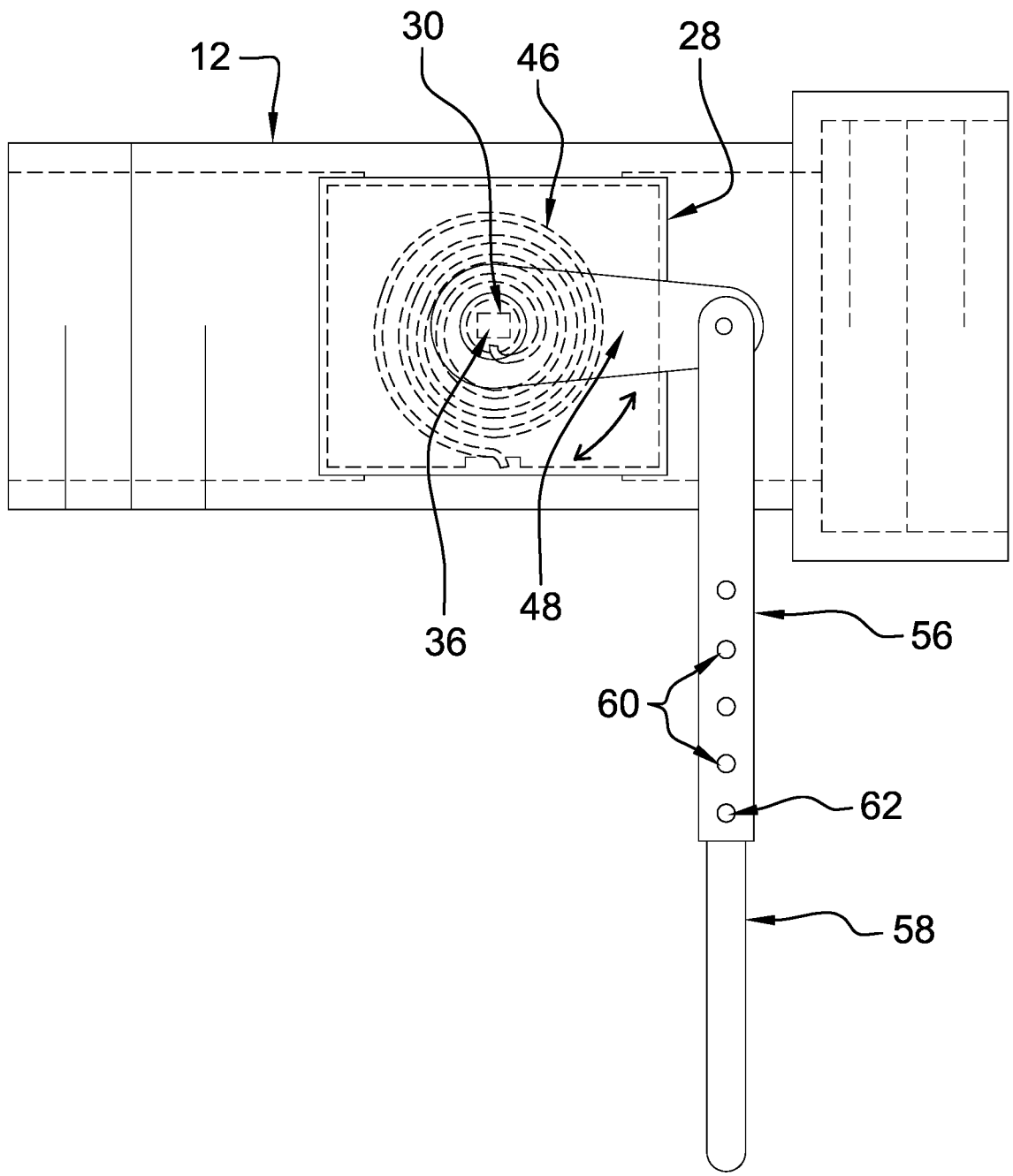
FIG. 10 is a second side detail view of an embodiment of the disclosure.
Figure 11:
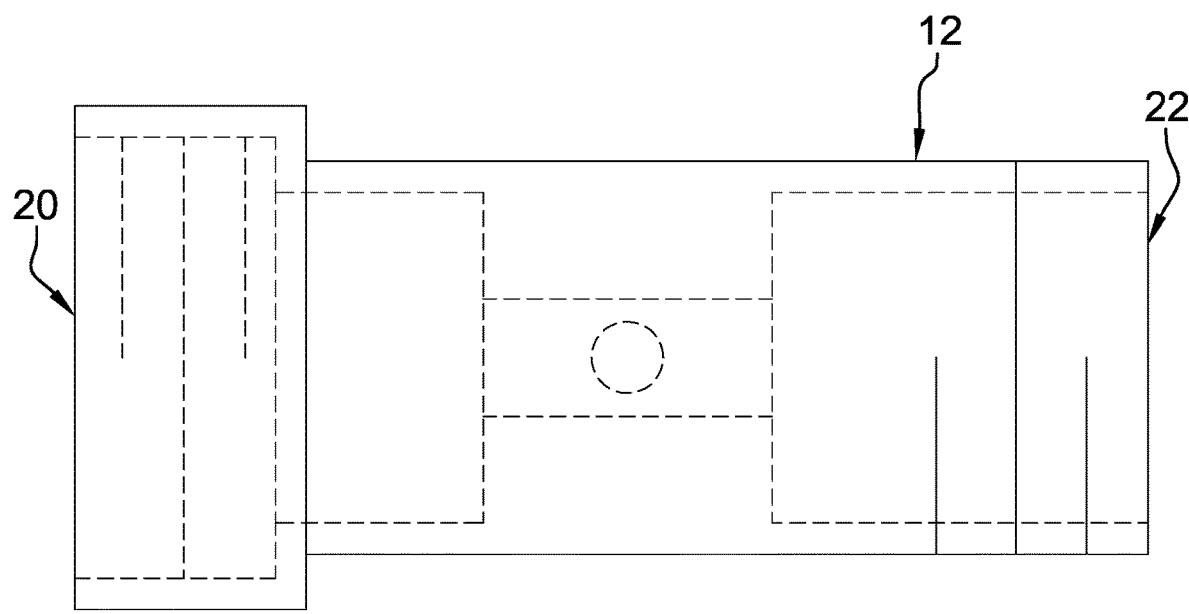
FIG. 11 is a first side detail view of an embodiment of the disclosure.
Figure 12:
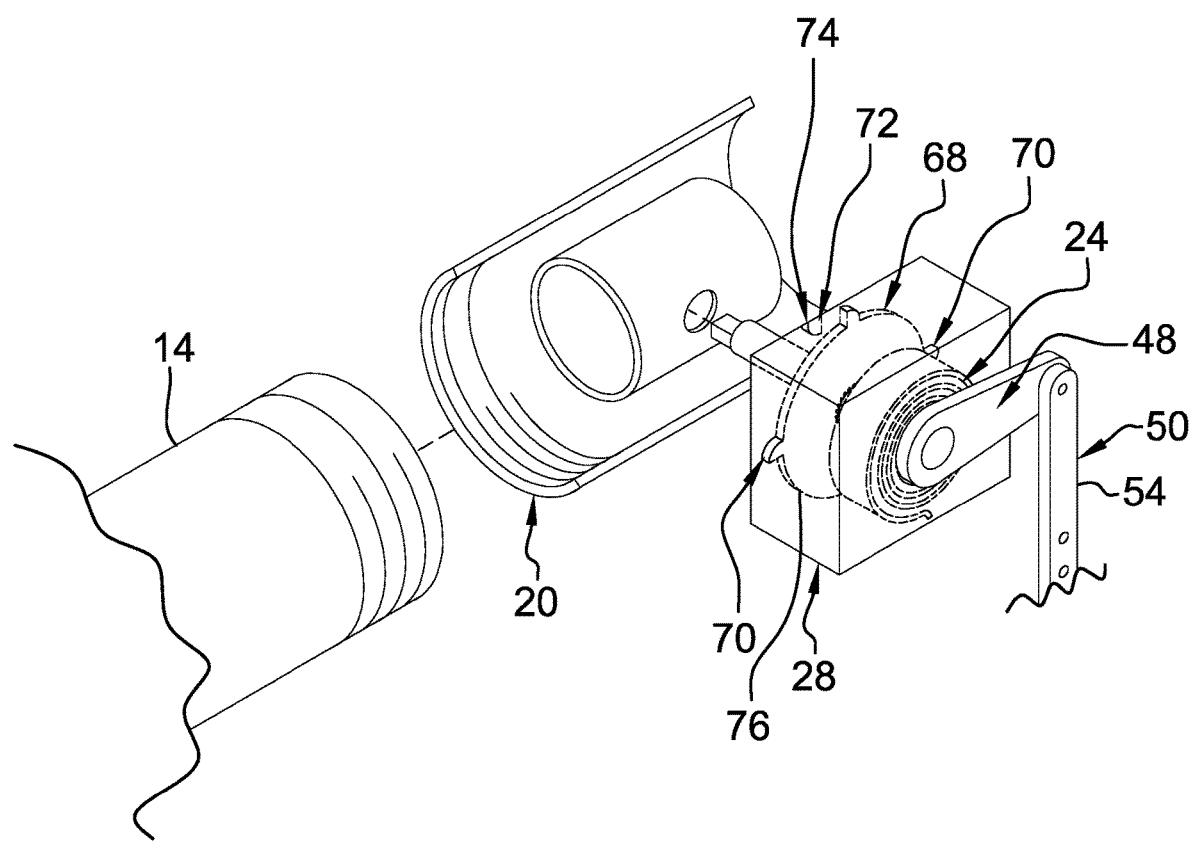
FIG. 12 is an exploded view of an embodiment of the disclosure.

In another configuration, as shown in FIGS. 10 and 11, a cogwheel 68 is positioned in the housing 28 and is attached to the shaft 30. The cogwheel 68 comprises four cogs 70, which are evenly spaced around a circumference 76 of the cogwheel 68, as shown in FIG. 12. A pawl 72 is engaged to an inner facet 74 of the housing 28 and is positioned to selectively engage a respective cog 70 as the cogwheel 68 is rotated upon the user pulling the handle 50. Each movement of the handle 50 rotates the cogwheel 68 by 90°, with the valve 24 being alternately positioned in the open configuration and the closed configuration. While not shown in the Figures, the present invention anticipates the pawl 72 being rotationally engaged to the housing 28 and the valve assembly 10 comprising a release trigger. The release trigger would be engaged to the housing 28 and operationally engaged to the pawl 72 so that triggering of the release trigger would allow counter rotation of the cogwheel 68 concurrent with rebounding of the torsion spring 46.

In use, the tube 12 is inserted between and attached to the inlet pipe 14 and the shower head 18. The hook 64 is mounted to the wall 66 of the shower enclosure 16 below the inlet pipe 14 so that the chain 52 can be hooked to it to fix the valve 24 in the closed configuration. To start a flow of water to the shower head 18, the chain 52 is simply disengaged from the hook 64, thereby allowing the biaser 44 to bias the valve 24 to the open configuration so that water flows through the tube 12 to the shower head 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A valve assembly comprising:
  a tube configured to be inserted between and attached to an inlet pipe for a shower enclosure and a shower head, such that the shower head is in fluidic communication with the inlet pipe;
  a valve positioned in and rotationally attached to the tube, wherein the valve is configured for regulating a flow of water through the tube;
  a housing attached to the tube;
  a shaft attached by a first terminus to the valve and extending through respective sidewalls of the tube and the housing, such that a second terminus of the shaft is external to the housing;
  a biaser positioned in and attached to the housing, the biaser being operationally engaged to the shaft, such that the biaser biases the valve to an open configuration;
  a lever arm attached to and extending from the second terminus of the shaft;
  a handle attached to the lever arm distal from the shaft, wherein the handle is configured for grasping in a hand of a user for moving the handle from a first position to a second position for actuating the biaser for rotating the valve from a closed configuration to the open configuration, such that water flows through the tube to the shower head, wherein the handle comprising a chain or a bar; and a hook configured to be mountable to a wall of the shower enclosure below the inlet pipe, such that the hook is positioned for selectively hooking the chain for fixedly positioning the handle in the first position with the valve in the closed configuration.

2. The valve assembly of claim 1, wherein a first end of the tube is internally threaded and a second end of the tube is externally threaded, such that the first end and the second end are complementary to external threads on the inlet pipe and internal threads of the shower head, respectively.

3. The valve assembly of claim 1, wherein the valve comprises a ball valve.

4. The valve assembly of claim 1, further including a rod attached to and extending from the valve into a recess extending into an inner surface of the tube, the rod being opposingly positioned on the valve relative to the shaft, such that the rod is rotatable within the recess and positioned for stabilizing the valve within the tube.

5. The valve assembly of claim 3, wherein the biaser comprises a torsion spring.

6. The valve assembly of claim 1, further including:
the bar comprising an upper segment rotationally engaged to the lever arm and a lower segment selectively extensible from the upper segment;
a plurality of holes positioned in the upper segment; and
a pin engaged to the lower segment, the pin being spring loaded, such that the pin is depressible for extending or retracting the lower segment, and such that the pin is positioned for extending into a respective hole for fixedly positioning the lower segment relative to the upper segment.

7. The valve assembly of claim 5, further including:
a cogwheel positioned in the housing and attached to the shaft, the cogwheel comprising four cogs evenly spaced around a circumference of the cogwheel; and
a pawl engaged to an inner facet of the housing, such that the pawl is positioned for selectively engaging a respective cog as the cogwheel is rotated upon the user pulling the handle, such that each movement of the handle rotates the cogwheel 90° and the valve alternately between the open configuration and the closed configuration.

8. A valve assembly comprising:
a tube configured to be inserted between and attached to an inlet pipe for a shower enclosure and a shower head, such that the shower head is in fluidic communication with the inlet pipe, the tube having a first end and a second end, the first end being internally threaded, the second end being externally threaded, such that the first end and the second end are complementary to external threads on the inlet pipe and internal threads of the shower head, respectively;

a valve positioned in and rotationally attached to the tube, wherein the valve is configured for regulating a flow of water through the tube, the valve comprising a ball valve;
a housing attached to the tube;
a shaft attached by a first terminus to the valve and extending through respective sidewalls of the tube and the housing, such that a second terminus of the shaft is external to the housing;
a rod attached to and extending from the valve into a recess extending into an inner surface of the tube, the rod being opposingly positioned on the valve relative to the shaft, such that the rod is rotatable within the recess and positioned for stabilizing the valve within the tube;
a biaser positioned in and attached to the housing, the biaser being operationally engaged to the shaft, such that the biaser biases the valve to an open configuration, the biaser comprising a torsion spring;
a lever arm attached to and extending from the second terminus of the shaft;
a handle attached to the lever arm distal from the shaft, wherein the handle is configured for grasping in a hand of a user for moving the handle from a first position to a second position for actuating the biaser for rotating the valve from a closed configuration to the open configuration, such that water flows through the tube to the shower head, the handle comprising a chain or a bar;
a cogwheel positioned in the housing and attached to the shaft, the cogwheel comprising four cogs evenly spaced around a circumference of the cogwheel;
a pawl engaged to an inner facet of the housing, such that the pawl is positioned for selectively engaging a respective cog as the cogwheel is rotated upon the user pulling the handle, such that each movement of the handle rotates the cogwheel 90° and the valve alternately between the open configuration and the closed configuration; and
a hook configured to be mountable to a wall of the shower enclosure below the inlet pipe, such that the hook is positioned for selectively hooking the chain for fixedly positioning the handle in the first position with the valve in the closed configuration.

9. The valve assembly of claim 8, further including:
the bar comprising an upper segment rotationally engaged to the lever arm and a lower segment selectively extensible from the upper segment;
a plurality of holes positioned in the upper segment; and
a pin engaged to the lower segment, the pin being spring loaded, such that the pin is depressible for extending or retracting the lower segment, and such that the pin is positioned for extending into a respective hole for fixedly positioning the lower segment relative to the upper segment.

\* \* \* \* \*